United States Patent
Zhang et al.

(10) Patent No.: US 12,540,858 B2
(45) Date of Patent: Feb. 3, 2026

(54) TERAHERTZ KINETIC INDUCTANCE BOLOMETER, PREPARATION METHOD THEREOF AND TERAHERTZ DETECTION SYSTEM

(71) Applicant: ZHEJIANG LAB, Hangzhou (CN)

(72) Inventors: Xiaohang Zhang, Hangzhou (CN); Lihui Yang, Hangzhou (CN); Yanru Song, Hangzhou (CN); Shiling Yu, Hangzhou (CN); Xiaomi Yan, Hangzhou (CN); Hongli Zhu, Hangzhou (CN); Yue Hong, Hangzhou (CN); Tangjie Mu, Hangzhou (CN); Zhiwei Chen, Hangzhou (CN); Ran Duan, Hangzhou (CN); Zhifeng Zhao, Hangzhou (CN); Yi Feng, Hangzhou (CN); Di Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 280 days.

(21) Appl. No.: 18/383,439

(22) Filed: Oct. 24, 2023

(65) Prior Publication Data
US 2024/0426671 A1    Dec. 26, 2024

(30) Foreign Application Priority Data
Jun. 26, 2023    (CN) .......................... 202310759172.6

(51) Int. Cl.
*G01J 5/22*    (2006.01)
*G01J 5/20*    (2006.01)

(52) U.S. Cl.
CPC ........... *G01J 5/22* (2013.01); *G01J 2005/208* (2013.01)

(58) Field of Classification Search
CPC ...... G01J 5/22; G01J 2005/208; G01J 5/0837; G01J 5/20; G01J 5/46
See application file for complete search history.

(56) References Cited

U.S. PATENT DOCUMENTS

| | | | | | |
|---|---|---|---|---|---|
| 4,287,418 | A | * | 9/1981 | Divin | G01J 3/28 |
| | | | | | 250/336.1 |
| 5,354,989 | A | * | 10/1994 | Fenner | G01J 3/2803 |
| | | | | | 250/336.2 |

(Continued)

FOREIGN PATENT DOCUMENTS

CN    116878666 B  *  10/2023  ................. G01J 5/46

*Primary Examiner* — David P Porta
*Assistant Examiner* — Gisselle M Gutierrez
(74) *Attorney, Agent, or Firm* — Jiwen Chen; Joywin IP Law PLLC

(57) ABSTRACT

Disclosed in the present invention is a terahertz kinetic inductance bolometer, including a superconducting thin film layer, a terahertz antenna, a cutoff layer and a Si substrate, wherein the superconducting thin film layer and the terahertz antenna are respectively deposited on the cutoff layer, and the cutoff layer is deposited on the Si substrate; the superconducting thin film layer includes a superconducting feeder line, an inter-digital capacitor and an inductor coil; the inter-digital capacitor is connected with the inductor coil in parallel to form an oscillation circuit; the terahertz antenna is adjacent to the inductor coil and is used to convert a received terahertz signal into heat so that the inductor coil produces an inductance change; a resonance frequency in the inter-digital capacitor changes through the inductance change; and the superconducting feeder line receives the varying resonance frequency, through which an light intensity of the terahertz signal can be obtained to complete the detection of the terahertz signal. The terahertz kinetic inductance bolometer can detect the terahertz signal accurately and is less affected by the temperature. The present invention also provides a preparation method of the terahertz kinetic inductance bolometer and a terahertz detection system.

10 Claims, 12 Drawing Sheets

(56) References Cited

U.S. PATENT DOCUMENTS

| | | | |
|---|---|---|---|
| 9,366,574 B2 * | 6/2016 | Pereverzev | G01J 3/021 |
| 2012/0197575 A1 * | 8/2012 | Saveliev | G01N 21/359 |
| | | | 250/252.1 |
| 2014/0048708 A1 * | 2/2014 | Ouvrier-Buffet | G01J 5/24 |
| | | | 250/338.1 |
| 2015/0346085 A1 * | 12/2015 | Oberti | G01N 21/3504 |
| | | | 356/326 |
| 2016/0018267 A1 * | 1/2016 | Timofeev | G01J 5/024 |
| | | | 438/54 |
| 2021/0140833 A1 * | 5/2021 | Efetov | G01J 5/20 |
| 2023/0239058 A1 * | 7/2023 | Vernik | H04B 10/505 |
| | | | 398/79 |

* cited by examiner

SiO2 and SiNx double-layer

TERAHERTZ KINETIC INDUCTANCE BOLOMETER, PREPARATION METHOD THEREOF AND TERAHERTZ DETECTION SYSTEM

This application claims the priority of Chinese Application No. 2023107591726, filed Jun. 26, 2023, which is hereby incorporated by reference in its entirety.

FIELD OF TECHNOLOGY

The present invention belongs to the field of sensor technology, and in particular relates to a terahertz detection system, a terahertz kinetic inductance bolometer, and a preparation method thereof.

BACKGROUND TECHNOLOGY

A low-temperature superconducting detector is a special type of superconducting material, which can maintain a superconducting state at an extremely low temperature. The low-temperature superconducting detector is usually prepared by a superconducting material (such as NbN, NbTiN), and its structure usually includes the superconducting material, an electrode, a substrate and other parts. In a preparation process, a special process, such as sputtering or PECVD, is needed to ensure the superconductivity and stability of the detector. Because of its extremely high sensitivity, it has a wide range of applications in an astronomical detection, a nuclear physics detection and other aspects.

Internationally, the most used low-temperature superconducting detector is a superconducting transition edge sensor (TES), which uses some substances to suddenly change its resistivity to zero when a temperature is below a certain value (Tc). This state is called a superconducting state, such substances are called superconductors, and the Tc is called a transition temperature of a superconductor.

The TES has extremely high sensitivity for a temperature measurement and is often used to detect the kinetic energy of particles or the energy of single photons. A TES micro-energy device uses a steep resistance-temperature relationship of the superconducting TES in a superconducting transition module (the steep resistance-temperature relationship is referred to as steepness below) to achieve a single photon detection. The superconducting TES micro-energy device has the advantages of a wide wavelength range, easy development of a monolithic integrated micro-energy array, and multiplex readout of a detector array with a superconducting quantum interference device (SQUID) amplifier. Therefore, the superconducting TES micro-energy detector has been widely used in a highly sensitive single-photon detection, covering both X-ray and gamma-ray bands. The superconducting transition edge sensor is still widely used due to its extremely low noise equivalent power (generally between $1 \times 10^{-14}$ W/$\sqrt{Hz}$ and $1 \times 10^{-20}$ W/$\sqrt{Hz}$).

A Chinese patent with a public number of CN113659067A discloses a superconducting transition edge sensor, a preparation method and a micro-energy device, wherein the preparation method of the superconducting transition edge sensor comprises: providing a substrate; a superconducting metal thin film is formed on the upper surface of the substrate; a normal metal thin film is formed on the upper surface of the superconducting metal film, wherein the ratio of the thickness of the superconducting metal thin film to that of the normal metal thin film is 1-10, and the superconducting metal thin film and the normal metal thin film are formed in a vacuum cavity. The superconducting metal thin film and the normal metal thin film are formed on the substrate, and the ratio of the thickness of the superconducting metal thin film to that of the normal metal thin film is maintained in a range of 1-10. By controlling the ratio of the thickness of the superconducting metal thin film to that of the normal metal thin film, the uniformity of a Tc transition temperature and the controllability of a transition interval of the TES are improved.

However, the uniformity of the superconducting transition temperature Tc of the superconducting transition edge sensor disclosed in the above patent still has high requirements, and requires the use of a high-complexity amplifier such as an SQUID amplifier, and an operating temperature is 100 mK, which has a high demand for refrigeration, and it is difficult to achieve frequency division multiplexing and has a high system cost, and it is difficult to achieve a high pixel and large array detection.

SUMMARY OF THE INVENTION

A specific embodiment of the present invention provides a terahertz kinetic inductance bolometer, which can accurately detect a terahertz signal and is less affected by temperature. The present invention also provides a terahertz detection system capable of frequency division multiplexing, which can realize a high pixel and large array detection.

The specific embodiment of the present invention provides a terahertz kinetic inductance bolometer, comprising a superconducting thin film layer, a terahertz antenna, a cutoff layer and a Si substrate, wherein the superconducting thin film layer and the terahertz antenna are respectively deposited on the cutoff layer, and the cutoff layer is deposited on the Si substrate;

The superconducting thin film layer comprises a superconducting feeder line, an inter-digital capacitor and an inductor coil; the inter-digital capacitor is connected with the inductor coil in parallel to form an oscillation circuit; the terahertz antenna is adjacent to the inductor coil and is used to convert a received terahertz signal into heat so that the inductor coil produces an inductance change; a resonance frequency in the inter-digital capacitor changes through the inductance change; and the superconducting feeder line is coupled with the inter-digital capacitor to receive the varying resonance frequency, through which an light intensity of the terahertz signal can be obtained to complete the detection of the terahertz signal.

Further, the cutoff layer comprises a surround module, a thermal connection bridge and an island module; and the surround module surrounds the island module, and the surround module and the island module are connected through the thermal connection bridge; and the superconducting feeder line and the inter-digital capacitor are located at the top of the surround module, the inductor coil and the terahertz antenna are located at the top of the island module, and the Si substrate is located at the bottom of the surround module, so that the inductor coil and the terahertz antenna at the top of the island module are isolated from the Si substrate at the bottom of the surround module and the superconducting feeder line and the inter-digital capacitor at the top of the surround module.

Further, the cutoff layer comprises a $SiO_2$ layer and a $SiN_x$ layer, and the $SiO_2$ layer is deposited on the Si substrate, and the $SiN_x$ layer is located on the $SiO_2$ layer, wherein x is 1-4/3.

Further, the thickness of the $SiO_2$ layer is 100-200 nm the thickness of the $SiN_x$ layer is 300-2000 nm.

Further, the material of the superconducting thin film layer is niobium nitride, niobium titanium nitride or titanium nitride.

Further, the material of the terahertz antenna is titanium-tungsten alloy, aluminum-manganese alloy or bismuth.

A specific embodiment of the present invention also provides a preparation method of the terahertz kinetic inductance bolometer described as above, comprising:

(1) $SiO_2$ and $SiN_x$ double-layers are respectively deposited on both sides of a double-cast silicon substrate, namely, A and B surfaces, and a superconducting metal layer is grown on the $SiO_2$ and $SiN_x$ double-layer on the A surface by magnetron sputtering;

(2) on the surface of the superconducting metal layer, a circuit of the superconducting thin film layer is exposed through photoresist by an lithography machine, and the superconducting thin film layer is obtained by inductively coupled plasma (ICP) etching the superconducting metal layer;

(3) the remaining photoresist in step (2) is removed; the photoresist is used again to expose a circuit of the terahertz antenna on the surfaces of the $SiO_2$ and $SiN_x$ double layer and the superconducting thin film layer by using the lithography machine; metal of the terahertz antenna is deposited on the surface of the photoresist and exposed $SiO_2$ and $SiN_x$ double-layer by using a measurement and control sputtering technique; and the remaining photoresist is removed by a stripping method to obtain the terahertz antenna;

(4) the photoresist is used again to expose a pattern of the cutoff layer on the surface of the $SiO_2$ and $SiN_x$ double-layer on the A surface by using the lithography machine, and the cutoff layer is obtained by etching, and the residual photoresist is removed;

(5) a vehicle wafer is obtained; protective wax on the cutoff layer, the terahertz antenna and the superconducting thin film layer is bonded with the protective wax on the vehicle wafer;

(6) the $SiO_2$ and $SiN_x$ double-layer on the B surface of the double-cast silicon substrate is removed to expose the double-cast silicon substrate; the photoresist is used to expose the island module on the B surface of the double-cast silicon substrate by the lithography machine; the exposed double-cast silicon substrate is etched by a deep silicon reactive ion etching technique so as to obtain the Si substrate; and the remaining photoresist is removed; and (7) the terahertz kinetic inductance bolometer is obtained by removing the protective wax with organic solvent.

Further, the superconducting metal layer is grown by the magnetron sputtering on the $SiO_2$ and $SiN_x$ double-layer on the A surface; the superconducting metal is NbN; and the process parameters of the magnetron sputtering are as follows: an air pressure is 1-10 mTorr, power is 50-500 W, and a proportion of $N_2$ and Ar gas is 5%-50%.

Further, the measurement and control sputtering technique is used to deposit the metal of the terahertz antenna on the surface of the photoresist and the exposed $SiO_2$ and $SiN_x$ double-layer surface; the metal of the terahertz antenna is TiW alloy; and the process parameters of the measurement and control sputtering technique are as follows: an air pressure is 1-10 mTorr and power is 50-500 W.

A specific embodiment of the present invention also provides a terahertz detection system, comprising the plurality of terahertz kinetic inductance bolometers, wherein the plurality of terahertz kinetic inductance bolometers are arranged in an array; the plurality of terahertz kinetic inductance bolometers are divided into a plurality of groups; the plurality of terahertz kinetic inductance bolometers in each group share the superconducting feeder line for coupling; and the size of the inter-digital capacitance of each terahertz kinetic inductance bolometer is adjusted so that each terahertz kinetic inductance bolometer has a different initial resonance frequency, which can distinguish a region where each terahertz kinetic inductance bolometer is located, and then can simultaneously monitor an intensity change of a terahertz signal in the region where each terahertz kinetic inductance bolometer is located.

Compared with the prior art, the beneficial effects of the present invention are as follows:

(1) The terahertz kinetic inductance bolometer of the present invention uses the terahertz antenna made of common metal to receive the terahertz signal and increases the bandwidth of the received signal; the inductance of the inductor coil is changed by the heat generated by the terahertz antenna; the resonance frequency of the inter-digital capacitor is changed by the inductance change; the monitoring system reads the change of the transmission function in amplitude and phase based on the change of resonance frequency, so as to realize the monitoring of the light intensity of the terahertz signal; and since the resonance frequency is used to monitor the intensity of the terahertz signal in the present invention, as long as the superconducting material can produce superconducting properties, the requirement of the uniformity of the temperature of the superconducting material is low.

(2) The present invention uses the island module and surround module of the cutoff layer to isolate the inductor coil and the terahertz antenna from the Si substrate, the superconducting feeder line and the inter-digital capacitor, so as to avoid the influence of heat of other elements on the inductor coil and the terahertz antenna, thus being capable of more accurately reflecting the intensity of the terahertz signal.

(3) Since the terahertz kinetic inductance bolometer provided by the present invention uses the change of the resonance frequency to monitor the intensity of the terahertz signal, a large number of terahertz kinetic inductance bolometers can be coupled through the superconducting feeder line as long as the size of the inter-digital capacitor is changed to make the resonance frequencies of the terahertz kinetic inductance bolometers different; and the intensity change and the change time of the terahertz signal of the corresponding module can be monitored simultaneously based on the terahertz kinetic inductance bolometers with different resonant frequencies, which realizes the frequency division multiplexing and the high pixel and large array detection.

Figure 1:
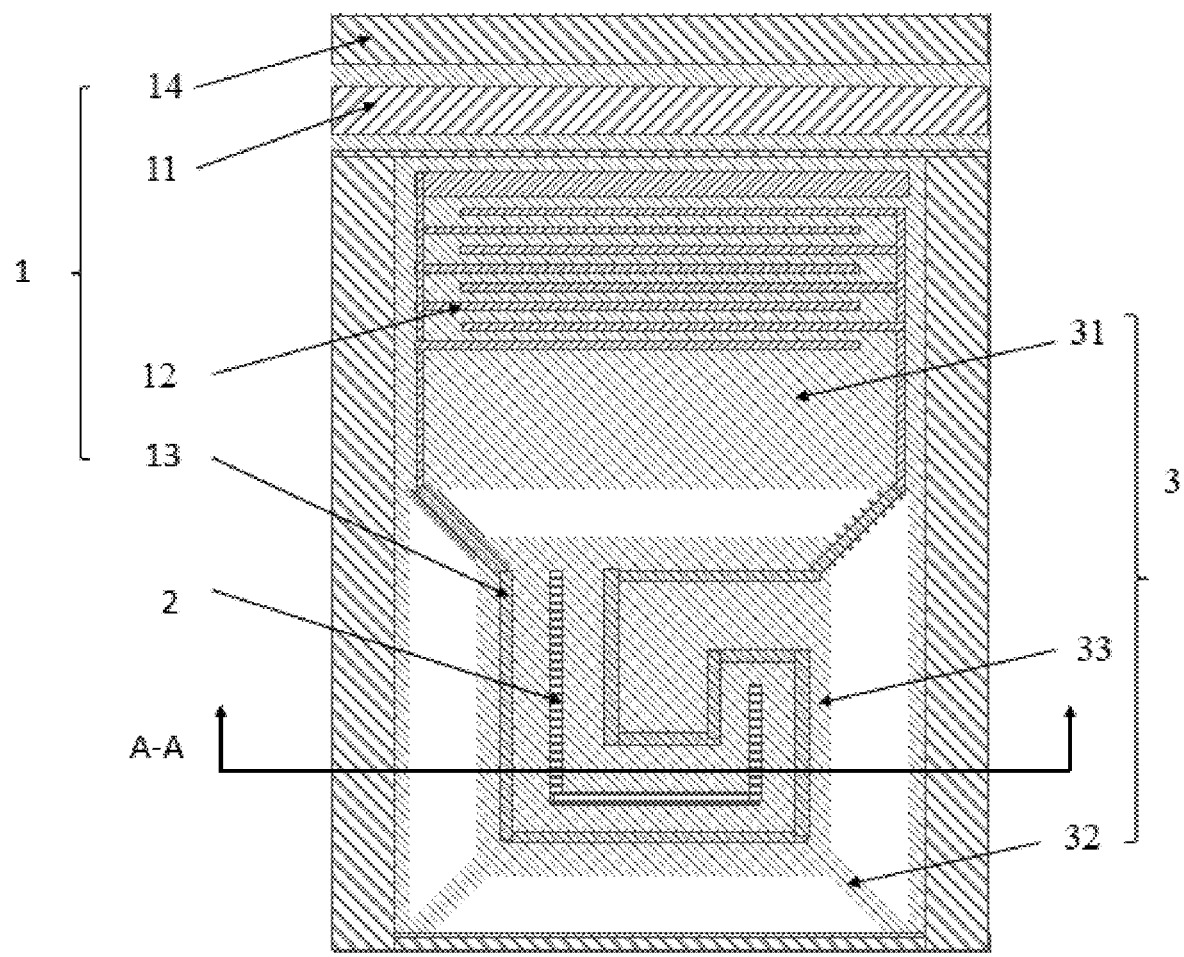
FIG. 1 is a top view of a terahertz kinetic inductance bolometer provided in a specific embodiment of the present invention.

Superconducting thin film layer 1, superconducting feeder line 11, inter-digital capacitor 12, inductor coil 13, ground wire 14, terahertz antenna 2, cutoff layer 3, surround module 31, thermal connection bridge 32, island module 33, Si substrate 4.

DESCRIPTION OF THE EMBODIMENTS

In order to make the purpose, technical solution and advantages of the present invention clearer, the present invention is further explained in detail by the attached drawings and embodiments. However, it should be understood that the specific embodiments described herein are intended only to explain the present invention and are not intended to limit the scope of the present invention. In addition, in the following explanation, descriptions of well-known structures and techniques are omitted to avoid unnecessary confusion of the concept of the present invention.

The specific embodiments of the present invention realize monitoring of the light intensity of a terahertz signal by using change of a resonance frequency, and uses an island module to avoid influence of other elements on an inductor coil and a terahertz antenna, so that the intensity of the terahertz signal can be accurately and efficiently monitored.

Figure 2:
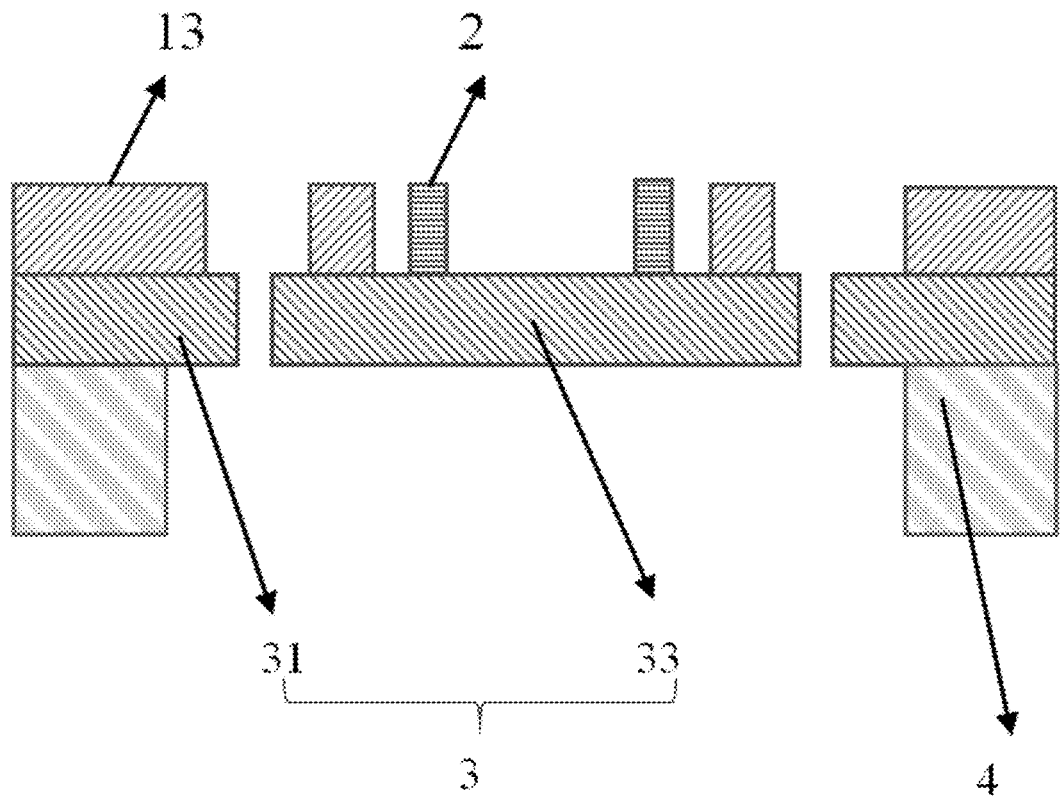
FIG. 2 is an A-A cross-section diagram of the terahertz kinetic inductance bolometer provided in the specific embodiment of the present invention.

As shown in FIG. 1 and FIG. 2, provided in a specific embodiment of the present invention is a terahertz kinetic inductance bolometer, comprising a superconducting thin film layer 1, a terahertz antenna 2, a cutoff layer 3 and a Si substrate 4, wherein the superconducting thin film layer 1 and the terahertz antenna 2 are respectively deposited on the cutoff layer 3, and the cutoff layer 3 is deposited on the Si substrate 4;

The superconducting thin film layer 1 provided in the specific embodiment of the present invention comprises a superconducting feeder line 11, an inter-digital capacitor 12 and an inductor coil 13; the inter-digital capacitor 12 is connected with the inductor coil 13 in parallel to form an LC oscillation circuit, that is an ultrasonic kinetic inductance resonator; the terahertz antenna 2 is adjacent to the inductor coil 13 and is used to convert a received terahertz signal into heat so that the inductor coil 13 produces an inductance change, which overcomes a defect in the prior art that an inductor coil made of a superconducting material has a higher superconducting energy gap and a narrower bandwidth for receiving the terahertz signal. In the specific embodiment of the present invention, the terahertz antenna 2 made of a common metal can receive a terahertz signal with a relatively wide bandwidth, and the resonance frequency in the inter-digital capacitor 12 is changed by an inductance change. The superconducting feeder line 11 is coupled with the inter-digital capacitor 12 to receive a changed resonance frequency, and the inter-digital capacitor 12 is also coupled with the ground wire 14. As the change of resonance frequency is proportional to the light intensity of the terahertz signal received by the detector, the detector is calibrated by the standard light intensity, and a relationship curve between the light intensity and the frequency change can be obtained, and then the light intensity of the terahertz signal can be calculated to complete the detection of the terahertz signal.

In a specific embodiment, back to FIG. 1, the cutoff layer 3 provided in this embodiment comprises a surround module 31, a thermal connection bridge 32 and an island module 33; and the surround module 31 surrounds the island module 33, and the surround module 31 and the island module 33 are connected through the thermal connection bridge 32.

Back to FIG. 1 and FIG. 2, the superconducting feeder line 11 and the inter-digital capacitor 12 provided in this embodiment are located on the surround module 31, the inductor coil 13 and the terahertz antenna 2 are located on the island module 33, and the Si substrate 4 is located on the bottom of the surround module 31, thus isolating the inductor coil 13 and the terahertz antenna 2 from the Si substrate 4, the superconducting feeder line 11 and the inter-digital capacitor 12, which prevents heat generated by the Si substrate 4, the superconducting feeder line 11 and the inter-digital capacitor 12 from affecting the inductor coil 13 to generate inductance, so that the inter-digital capacitor 12 can accurately produce the changing resonance frequency, and then an external monitoring system can accurately read changes of a transmission function in amplitude and phase to detect the intensity and time of the incident terahertz signal.

In a specific embodiment, the cutoff layer comprises a $SiO_2$ layer and a $SiN_x$ layer, and the $SiO_2$ layer is deposited on the Si substrate, and the $SiN_x$ layer is located on the $SiO_2$ layer, wherein x is 1-4/3. The thickness of the $SiO_2$ layer is 100-200 nm, and the thickness of the $SiN_x$ layer is 300-2000 nm.

In a specific embodiment, the material of the superconducting thin film layer is niobium nitride, niobium titanium nitride or titanium nitride. Because of a high kinetic inductance value of the above superconducting material, a resonant cavity with a high quality factor can be prepared. The material of the terahertz antenna is titanium-tungsten alloy, aluminum-manganese alloy or bismuth. Because of low heat capacity of the above metal material, efficiency of absorbing the terahertz signal is high.

The terahertz kinetic inductance bolometer (KIB) provided by the specific embodiments of the present invention, as a new type of superconducting bolometer, has the advantages of simple processing art, and high stability compared with a traditional superconducting transition edge bolometer (TES bolometer). The present invention can realize frequency division multiplexing, have a simple data read system, and further reduce a system cost. It can be applied in space astronomical exploration, terahertz security check and other aspects.

A core part of the superconducting kinetic inductance bolometer is a kinetic inductance microwave resonator. When the terahertz antenna in the bolometer converts the energy of the terahertz signal into phonon heat of a thermal insulation island, the temperature of a thermal radiation island would be changed, which would cause the surface impedance of the superconducting material to change. By reading the changes in amplitude and phase of the transmission function, the intensity and time of the incident terahertz signal can be detected. By changing the frequency of each kinetic inductance microwave resonator unit, the frequency division multiplexing can be realized, and thousands of detector units can be read with only one microwave feeder line.

The terahertz kinetic inductance bolometer provided by the specific embodiment of the present invention can work at a temperature of 4K by using an NbN with Tc of about 15K. Compared with a traditional superconducting transition edge sensor TES, which works at 100 mK, the requirement on space refrigeration is greatly reduced and the cost is reduced.

Figure 3:
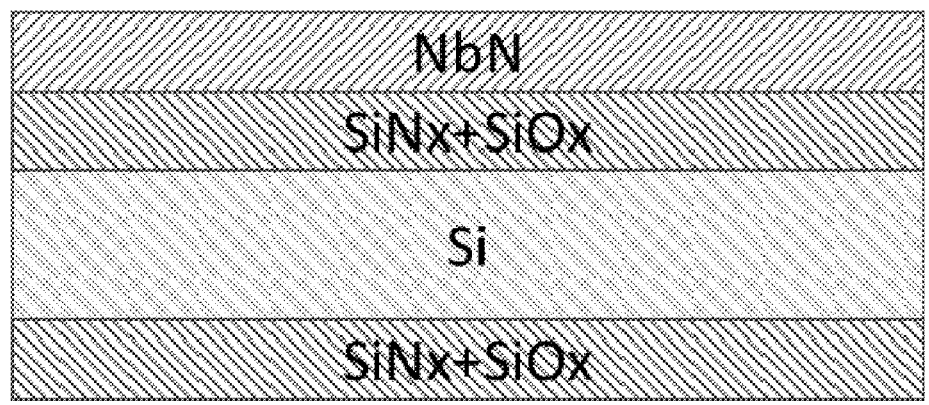
FIG. 3(a) through FIG. 3(q) are flowcharts of a preparation method of the terahertz kinetic inductance bolometer provided in a specific embodiment of the present invention.
Figure 3:
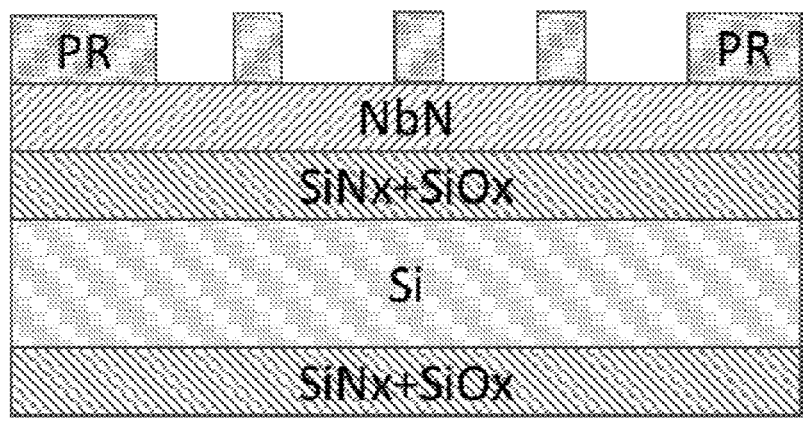
Figure 3:
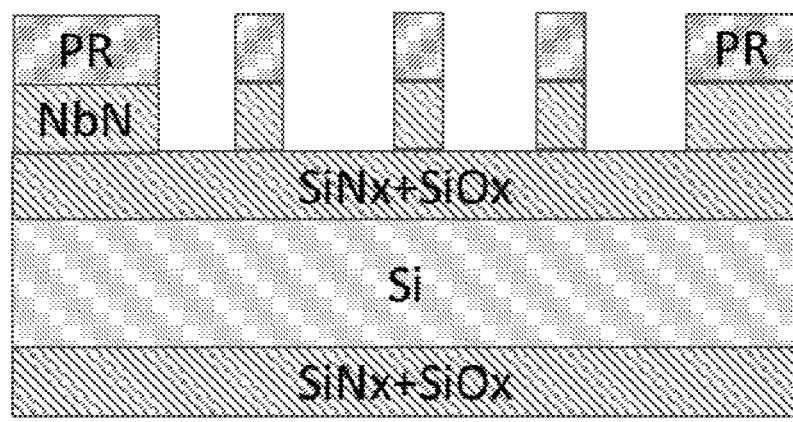
Figure 3:
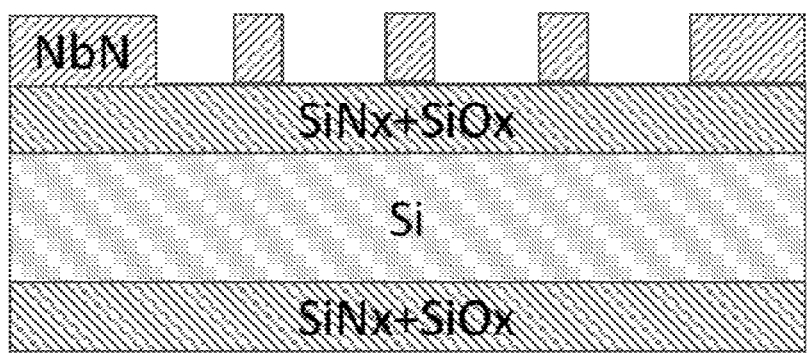
Figure 3:
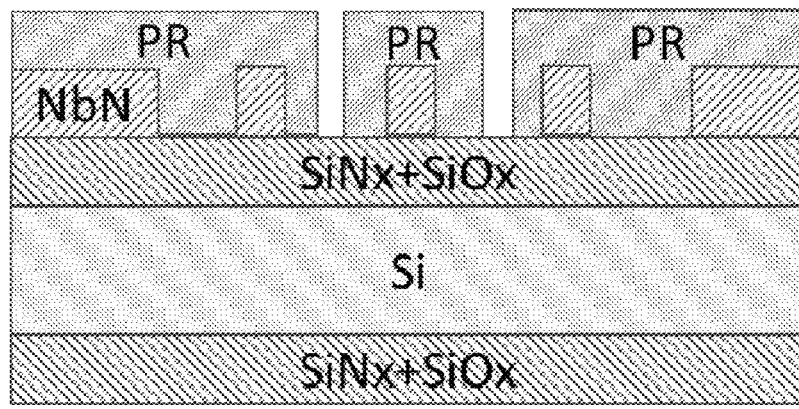
Figure 3:
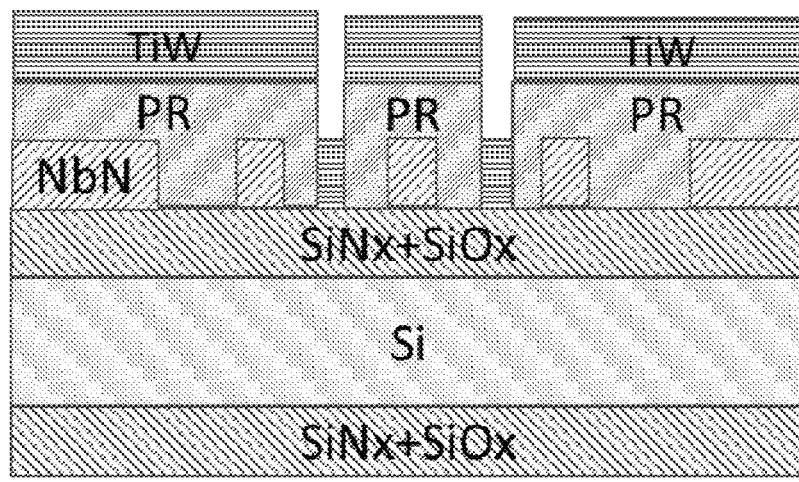
Figure 3:
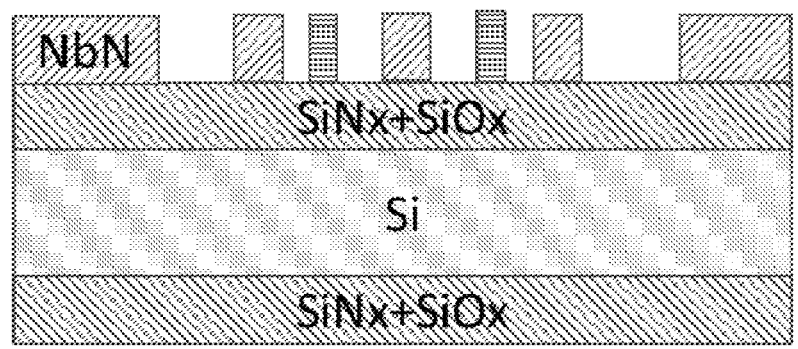
Figure 3:
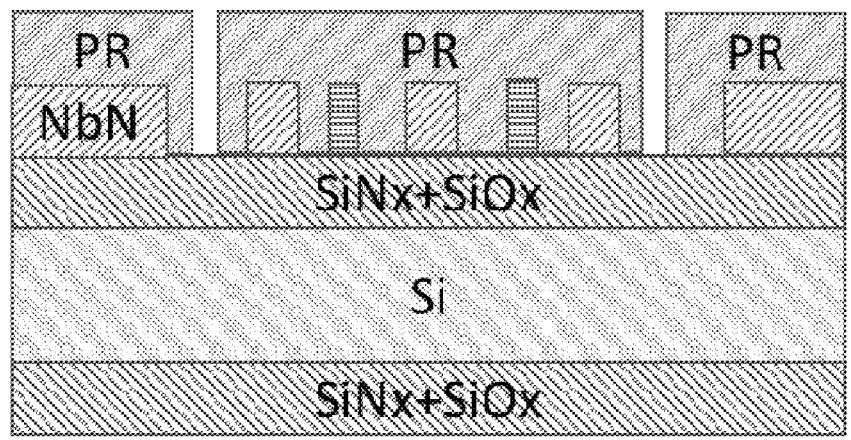
Figure 3:
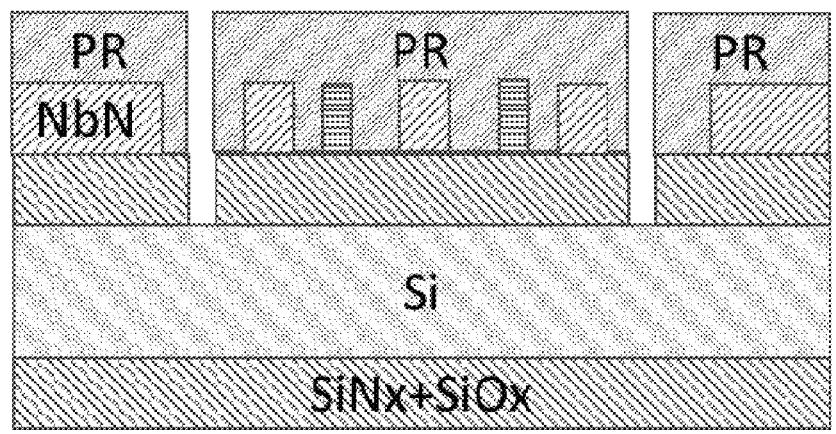
Figure 3:
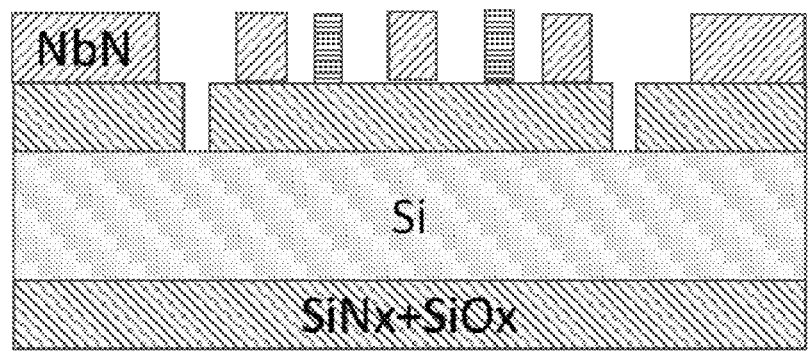
Figure 3:
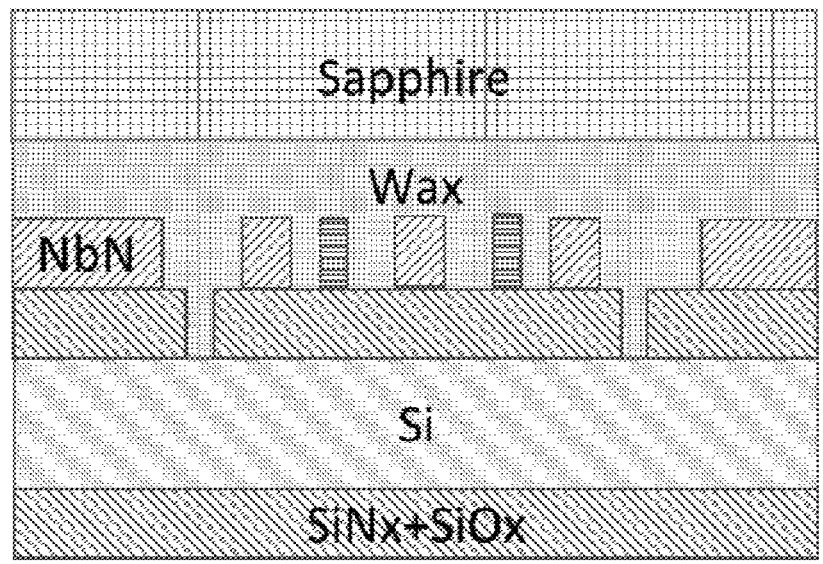
Figure 3:
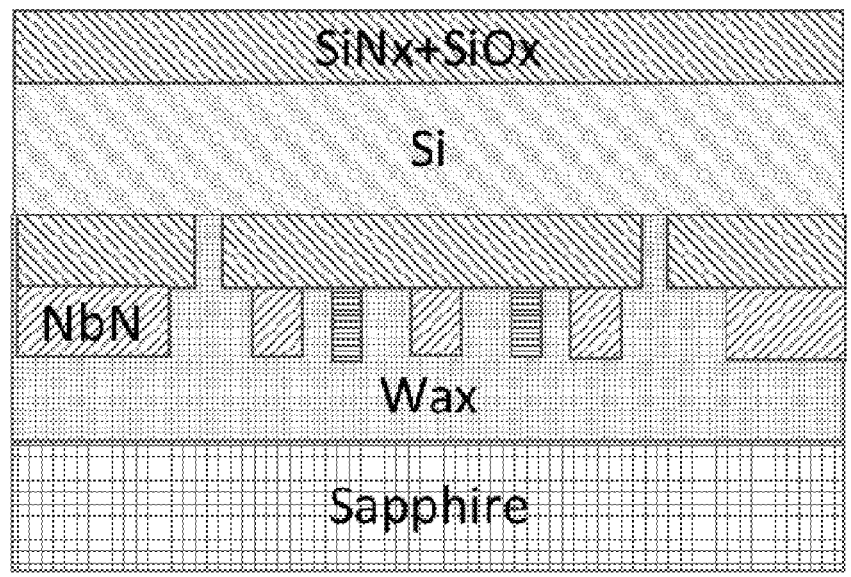
Figure 3:
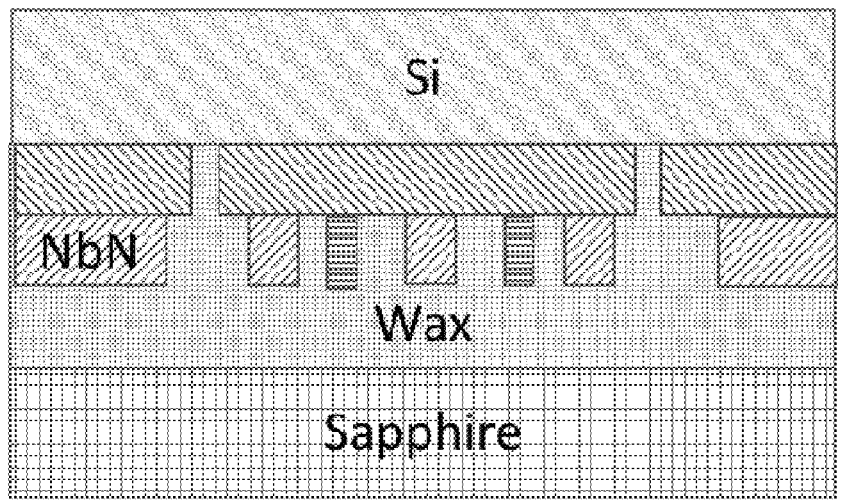
Figure 3:
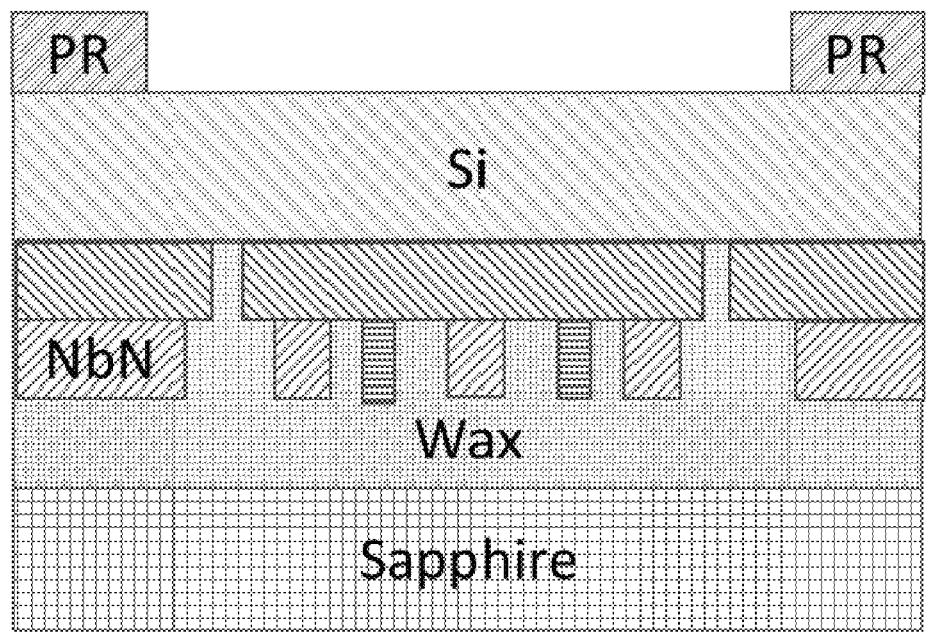
Figure 3:
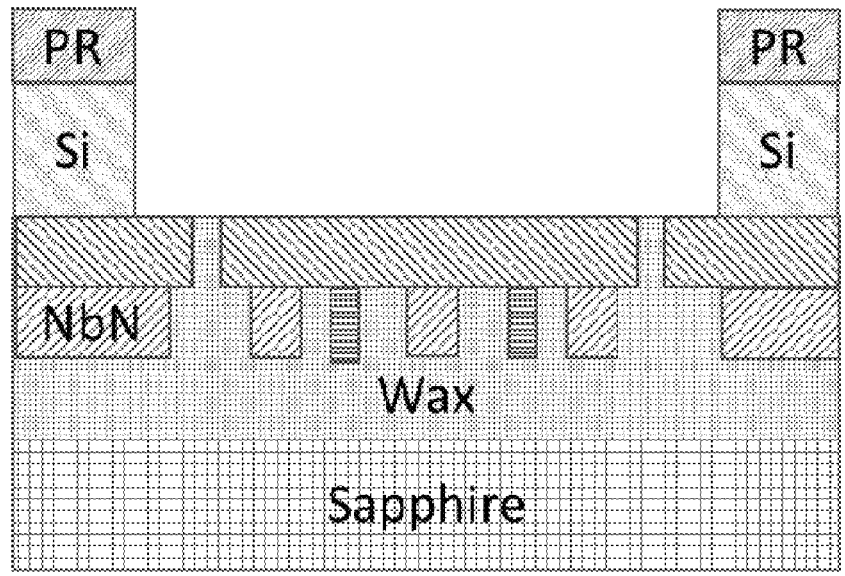
Figure 3:
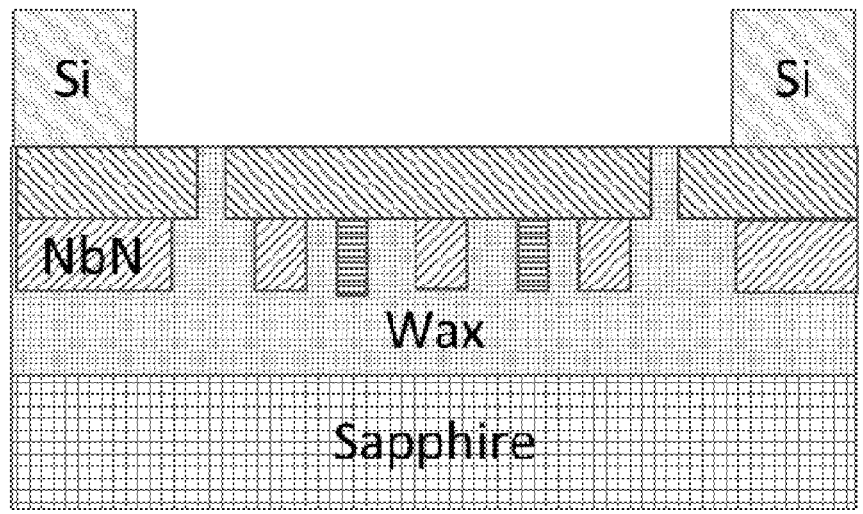
Figure 3:
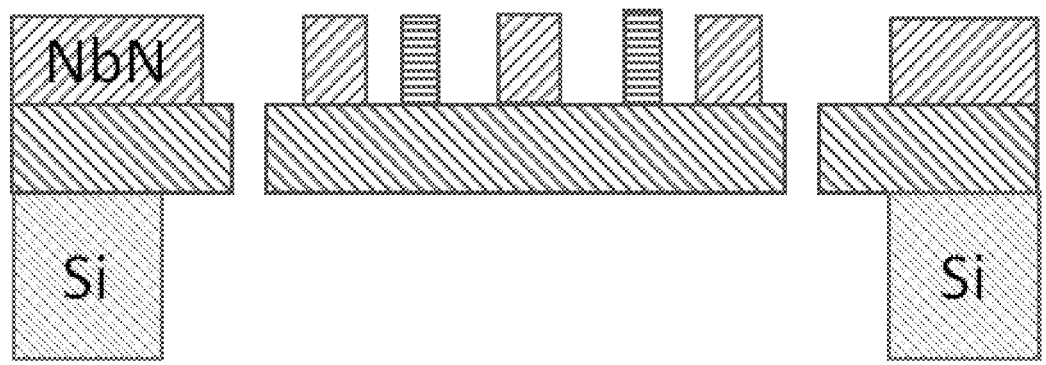

A specific embodiment of the present invention also provides a preparation method of the terahertz kinetic inductance bolometer, comprising:

(1) As shown in (a) of FIG. 3, $SiO_x$ and $SiN_x$ double-layers are grown by low pressure chemical vapor deposition (LPCVD) on both sides of a double-cast silicon substrate, namely, A and B surfaces (in fact, at a Si side is a $SiO_2$ layer). Generally, the $SiO_x$ is of 100-200 nm (which is the cutoff layer), the $SiN_x$ is of 300-2000 nm (which is the thin film layer), and the thickness needs to be changed according to different bolometer designs. An NbN superconducting metal layer is grown by magnetron sputtering on the A surface of the double-cast silicon substrate. The process parameters of the magnetron sputtering are as follows: an air pressure is 5 mTorr, power is 300 W, and an $N_2$/Ar ratio is 1:3.

Figure 4:
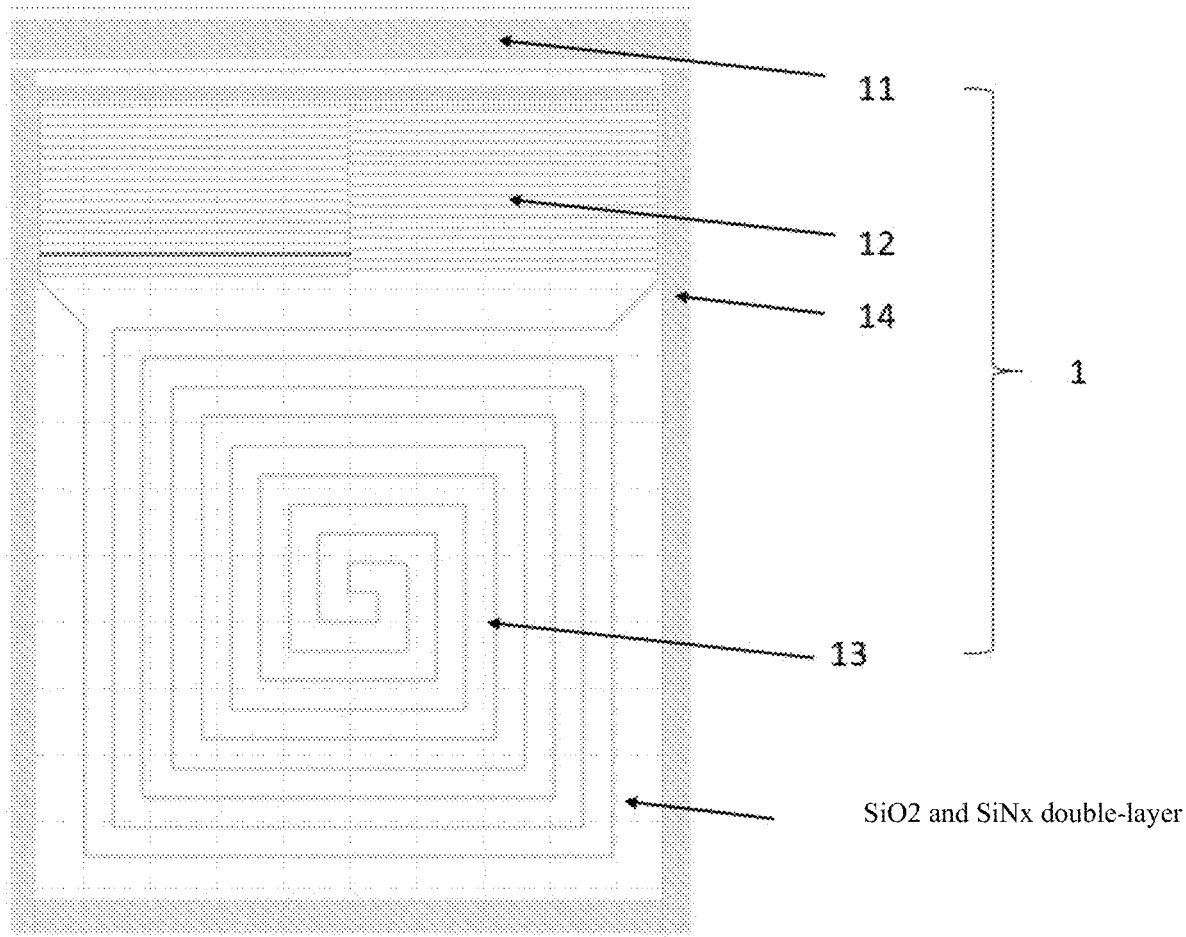
FIGS. 4(b), 4(b) and 4(c) are schematic cross-section diagrams of the flowchart of the preparation method of the terahertz kinetic inductance bolometer provided in a specific embodiment of the present invention.
Figure 4:
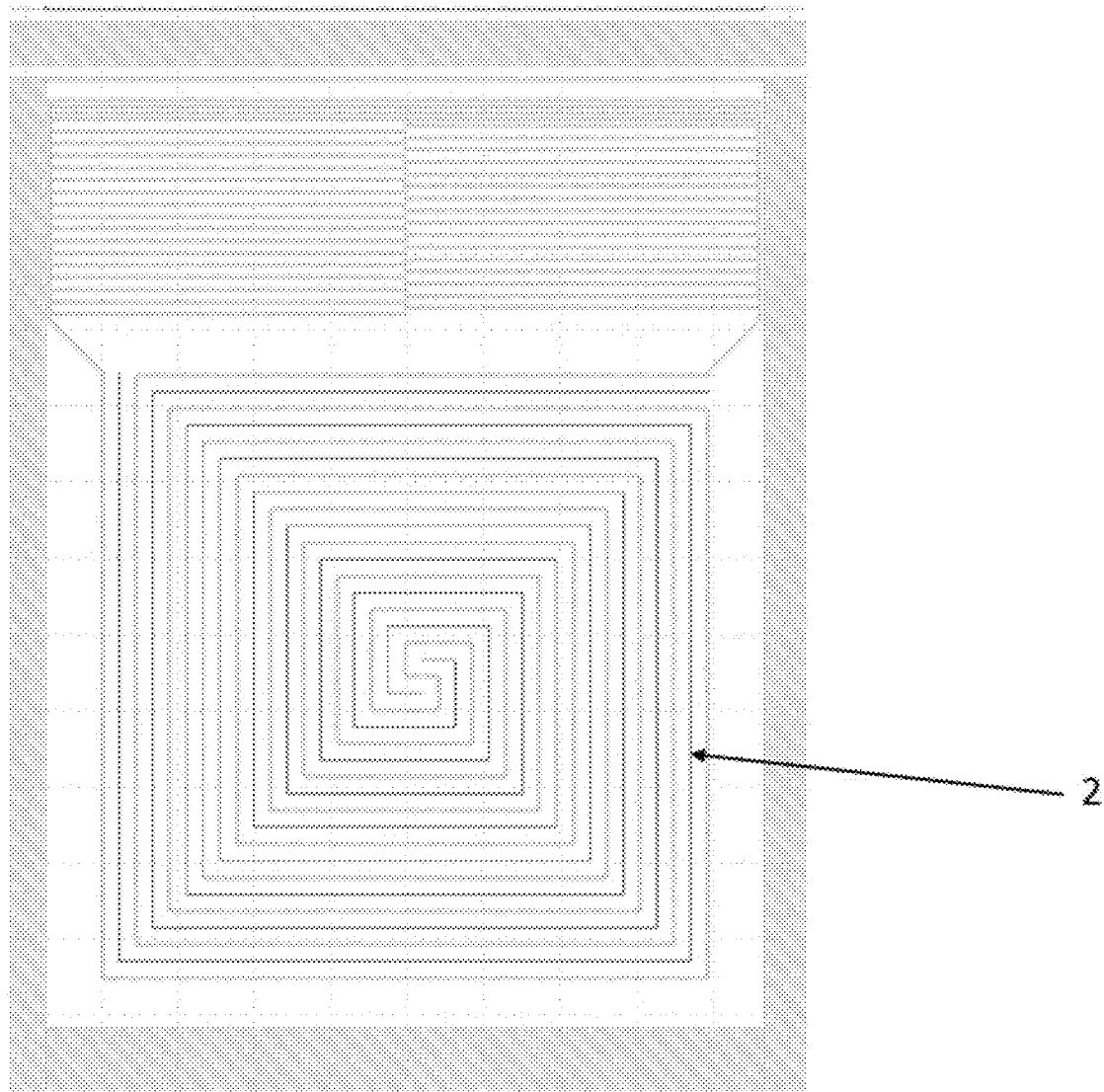
Figure 4:
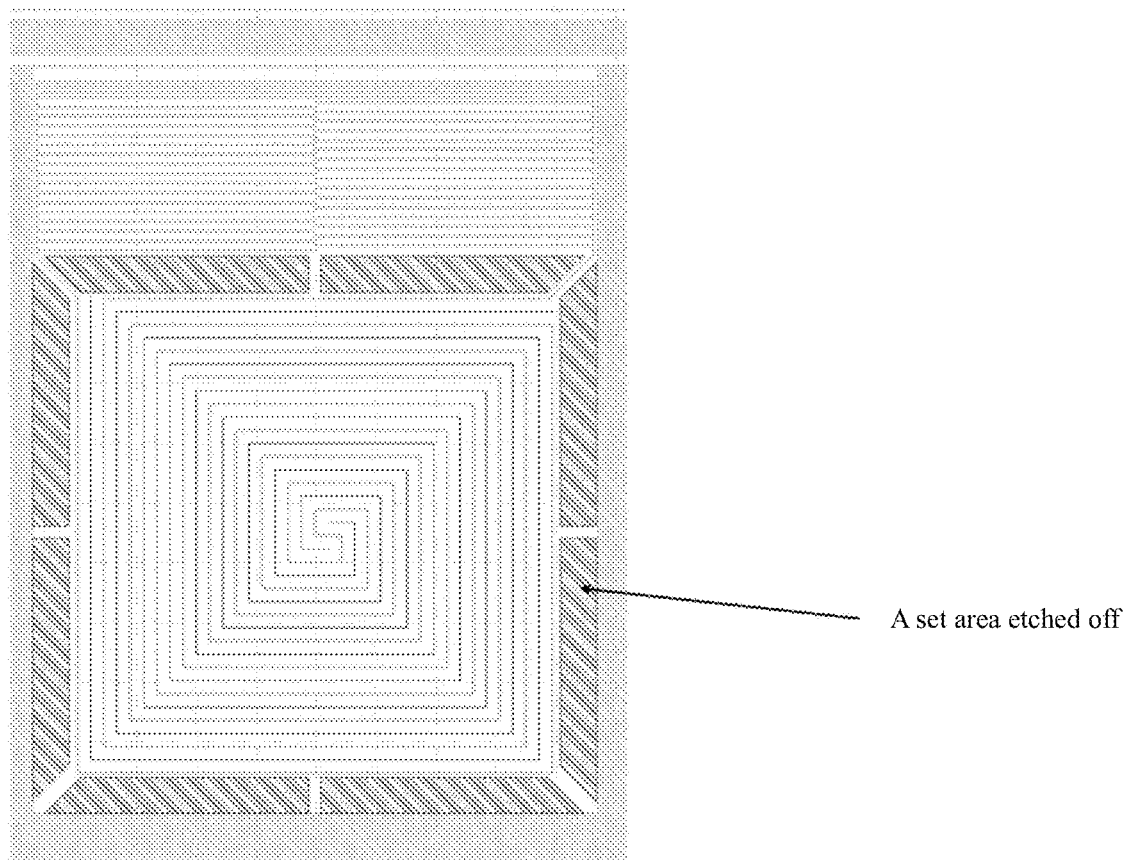

(2) As shown in (b) and (c) of FIG. 3, an lithography machine (such as an ASML PAS5500/350 KrF stepper lithography machine) is used to expose a circuit of the superconducting thin film layer on the surface of the NbN superconducting metal layer with photoresist PR, and a superconducting thin film layer 1 is obtained by etching the superconducting metal layer with ICP. A top view of the superconducting thin film layer 1 is as shown in (a) of FIG. 4, comprising the superconducting feeder line 11, the inter-digital capacitor 12, the inductor coil 13, and the ground wire 14.

(3) As shown in (d) of FIG. 3, an organic solvent such as toluene, acetone, isopropyl alcohol or ethanol and a plasma degumming machine are used to remove the remaining photoresist PR in step (2). As shown in (e) of FIG. 3, the lithography machine (such as the ASML PAS5500/350 KrF stepper lithography machine) is used to expose a circuit of the terahertz antenna on the surfaces of the $SiO_2$ and $SiN_x$ double-layer and the superconducting thin film layer. As shown in (f) of FIG. 3, a TiW terahertz antenna is deposited on the surface of the photoresist and the surface of the exposed $SiO_2$ and $SiN_x$ double-layer by using a measurement and control sputtering technique. As shown in (g) of FIG. 3, the organic solvent such as the toluene, acetone, isopropyl alcohol or ethanol is stripped in an ultrasonic machine in an ift-off manner, and the remaining photoresist is removed to obtain a TiW terahertz antenna 2, of which the top view is as shown in (b) of FIG. 4.

(4) As shown in (h) of FIG. 3, the lithography machine (such as the ASML PAS5500/350 KrF stepper lithography machine) is used to expose the island module and thermal connection bridge in the bolometer with the photoresist PR. As shown in (i) and (j) of FIG. 3, a plasma etching machine (RIE) is used to etch the $SiO_x$ and $SiN_x$ double-layer, and a set area between the island module and the surround module is etch off to obtain the cutoff layer 3. As shown in (c) of FIG. 4, the organic solvent such as the toluene, acetone, isopropyl alcohol or ethanol and the plasma degumming machine are used to remove the residual photoresist.

(5) As shown in (k) of FIG. 3, a sapphire vehicle wafer Sapphire is obtained; protective wax is spun on the cutoff layer, the terahertz antenna and the superconducting thin film layer; protective wax is spun on the sapphire carrier wafer, and they are bonded by the protective wax.

(6) As shown in (l) and (m) of FIG. 3, the $SiO_2$ and $SiN_x$ double-layer on the B surface of the double-cast silicon substrate is removed by using the RIE so as to expose the double-cast silicon substrate. As shown in (n) of FIG. 3, the photoresist is used to expose the island module on the B surface of the double-cast silicon substrate by the lithography machine. As shown in (o) and (p) of FIG. 3, the exposed double-cast silicon substrate is etched by a deep silicon reactive ion etching technique so as to obtain the Si substrate; and the remaining photoresist is removed.

(7) As shown in (q) of FIG. 3, the terahertz kinetic inductance bolometer is obtained by removing the protective wax with the organic solvent and stripping the sapphire vehicle wafer.

Figure 5:
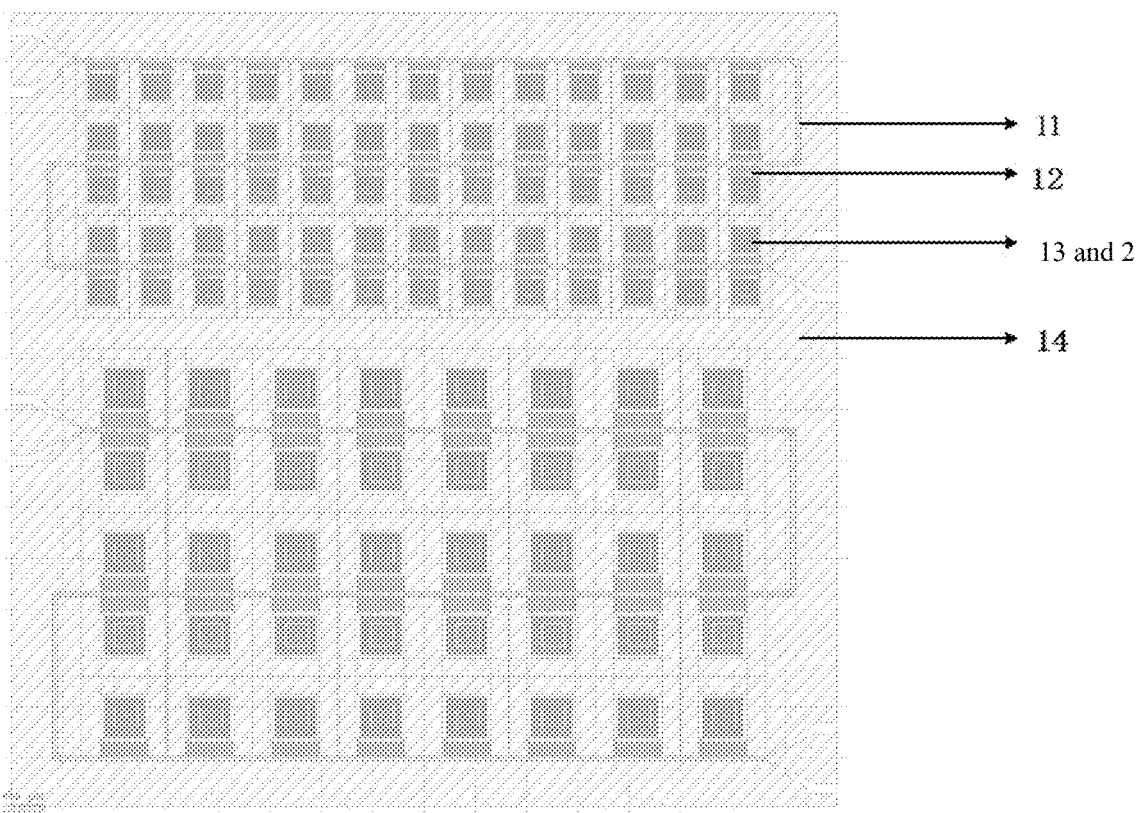
FIG. 5 is a schematic top view of the flowchart of the preparation method of the terahertz kinetic inductance bolometer provided in a specific embodiment of the present invention.

A specific embodiment of the present invention also provides a terahertz detection system as shown in FIG. 5, comprising a plurality of terahertz kinetic inductance bolometers, wherein the plurality of terahertz kinetic inductance bolometers are arranged in an array; the plurality of terahertz kinetic inductance bolometers are divided into a plurality of groups; the plurality of terahertz kinetic inductance bolometers in each group share the superconducting feeder line 11 for coupling, namely, the inter-digital capacitors 12 in each group of the plurality of terahertz kinetic inductance bolometers can be coupled through the superconducting feeder line 11, and the plurality of groups of terahertz kinetic inductance bolometers are wrapped by a ground wire 14. The terahertz detection system provided by the specific embodiment of the present invention is simple in structure, saves the material of the feeder line, and makes each terahertz kinetic inductance bolometer have a different initial resonance frequency by adjusting the size of the inter-digital capacitor of each terahertz kinetic inductance bolometer. Since different terahertz kinetic inductance bolometers have different initial resonance frequencies, when the terahertz signal illuminates the terahertz detection system, the region where each terahertz kinetic inductance bolometer is located can be distinguished, and the intensity change and time of the terahertz signal in the region where each terahertz kinetic inductance bolometer is located can be monitored simultaneously.

The preparation method of the terahertz detection system of the present invention is not limited by the wafer area, and the resonant frequency of the resonant cavity can be changed by changing the capacitance size of the resonant cavity. Each feeder line can multiplex 2000 pixel elements in a frequency range of 4-8 GHz at 2 MHz interval in the frequency division multiplexing manner, and a terahertz detection system with high pixels and a large array can be further developed through array. It can fill the gap of a focal plane detector in a domestic passive terahertz security check system. The present invention uses the NbN thin film to increase the operating temperature, thus reducing the requirement of reducing the temperature of the refrigerator and thus reducing the cost of system integration. The following FIG. 5 shows a microwave kinetic inductance bolometer with 105 pixel elements in 8×8 $mm^2$:

Compared with superconducting transition edge sensor TES, which requires a voltage control line for each pixel, and a set of superconducting quantum interferometer test lines TESs, the KIB can suspend terahertz kinetic inductance bolometers with different resonant frequencies in one feeder line, and multiplex 2000 pixel elements in the frequency range of 4-8 GHz at 2 MHz interval in the frequency division multiplexing manner, and can use 5 groups of coaxial lines to more quickly form a detector with tens of thousands of pixels.

The invention claimed is:

1. A terahertz kinetic inductance bolometer, comprising a superconducting thin film layer, a terahertz antenna, a cutoff layer and a Si substrate, wherein the superconducting thin film layer and the terahertz antenna are respectively deposited on the cutoff layer, and the cutoff layer is deposited on the Si substrate;

the superconducting thin film layer comprises a superconducting feeder line, an inter-digital capacitor and an inductor coil; the inter-digital capacitor is connected with the inductor coil in parallel to form an oscillation circuit; the terahertz antenna is adjacent to the inductor coil and is used to convert a received terahertz signal into heat so that the inductor coil produces an inductance change; a resonance frequency in the inter-digital capacitor changes through the inductance change; and the superconducting feeder line is coupled with the inter-digital capacitor to receive the varying resonance frequency, through which an light intensity of the terahertz signal can be obtained to complete the detection of the terahertz signal.

2. The terahertz kinetic inductance bolometer according to claim 1, wherein the cutoff layer comprises a surround module, a thermal connection bridge and an island module; and the surround module surrounds the island module, and the surround module and the island module are connected through the thermal connection bridge; and the superconducting feeder line and the inter-digital capacitor are located at the top of the surround module, the inductor coil and the terahertz antenna are located at the top of the island module, and the Si substrate is located at the bottom of the surround module, so that the inductor coil and the terahertz antenna at the top of the island module are isolated from the Si substrate at the bottom of the surround module and the superconducting feeder line and the inter-digital capacitor at the top of the surround module.

3. The terahertz kinetic inductance bolometer according to claim 1, wherein the cutoff layer comprises a $SiO_2$ layer and a $SiN_x$ layer, and the $SiO_2$ layer is deposited on the Si substrate, and the $SiN_x$ layer is located on the $SiO_2$ layer, wherein x is 1⅓.

4. The terahertz kinetic inductance bolometer according to claim 3, wherein the thickness of the $SiO_2$ layer is 100-200 nm, and the thickness of the $SiN_x$ layer is 300-2000 nm.

5. The terahertz kinetic inductance bolometer according to claim 1, wherein the material of the superconducting thin film layer is niobium nitride, niobium titanium nitride or titanium nitride.

6. The terahertz kinetic inductance bolometer according to claim 1, wherein the material of the terahertz antenna is titanium-tungsten alloy, aluminum-manganese alloy or bismuth.

7. A preparation method of the terahertz kinetic inductance bolometer according to claim 1, comprising:
(1) $SiO_2$ and $SiN_x$ double-layers are respectively deposited on both sides of a double-cast silicon substrate, namely, A and B surfaces, and a superconducting metal layer is grown on the $SiO_2$ and $SiN_x$ double-layer on the A surface by magnetron sputtering;
(2) on the surface of the superconducting metal layer, a circuit of the superconducting thin film layer is exposed through photoresist by an lithography machine, and the superconducting thin film layer is obtained by inductively coupled plasma (ICP) etching the superconducting metal layer;
(3) the remaining photoresist in step (2) is removed; the photoresist is used again to expose a circuit of the terahertz antenna on the surfaces of the $SiO_2$ and $SiN_x$ double layer and the superconducting thin film layer by using the lithography machine; metal of the terahertz antenna is deposited on the surface of the photoresist and exposed $SiO_2$ and $SiN_x$ double-layer by using a measurement and control sputtering technique; and the remaining photoresist is removed by a stripping method to obtain the terahertz antenna;
(4) the photoresist is used again to expose a pattern of the cutoff layer on the surface of the $SiO_2$ and $SiN_x$ double-layer on the A surface by using the lithography machine, and the cutoff layer is obtained by etching, and the residual photoresist is removed;
(5) a vehicle wafer is obtained; protective wax on the cutoff layer, the terahertz antenna and the superconducting thin film layer is bonded with the protective wax on the vehicle wafer;
(6) the $SiO_2$ and $SiN_x$ double-layer on the B surface of the double-cast silicon substrate is removed to expose the double-cast silicon substrate; the photoresist is used to expose the island module on the B surface of the double-cast silicon substrate by the lithography machine; the exposed double-cast silicon substrate is etched by a deep silicon reactive ion etching technique so as to obtain the Si substrate; and the remaining photoresist is removed; and
(7) the terahertz kinetic inductance bolometer is obtained by removing the protective wax with organic solvent.

8. The preparation method of the terahertz kinetic inductance bolometer according to claim 7, wherein the superconducting metal layer is grown by the magnetron sputtering on the $SiO_2$ and $SiN_x$ double-layer on the A surface; the superconducting metal is NbN; and the process parameters of the magnetron sputtering are as follows: an air pressure is 1-10 mTorr, power is 50-500W, and a proportion of $N_2$ and Ar gas is 5%-50%.

9. The preparation method of the terahertz kinetic inductance bolometer according to claim 7, wherein the measurement and control sputtering technique is used to deposit the metal of the terahertz antenna on the surface of the photoresist and the exposed $SiO_2$ and $SiN_x$ double-layer surface; the metal of the terahertz antenna is TiW alloy; and the process parameters of the measurement and control sputtering technique are as follows: an air pressure is 1-10 mTorr and power is 50-500W.

10. A terahertz detection system, comprising a plurality of terahertz kinetic inductance bolometers according to claim 1, wherein the plurality of terahertz kinetic inductance bolometers are arranged in an array; the plurality of terahertz kinetic inductance bolometers are divided into a plurality of groups; the plurality of terahertz kinetic inductance bolometers in each group share the superconducting feeder line for coupling; and the size of the inter-digital capacitance of each terahertz kinetic inductance bolometer is adjusted so that each terahertz kinetic inductance bolometer has a different initial resonance frequency, which can distinguish a region where each terahertz kinetic inductance bolometer is located, and then can simultaneously monitor an intensity change of a terahertz signal in the region where each terahertz kinetic inductance bolometer is located.

* * * * *